(12) United States Patent
Waxelbaum

(10) Patent No.: US 6,732,933 B2
(45) Date of Patent: May 11, 2004

(54) COUPLING OF BAR CODE DATA READERS TO MOBILE TERMINALS OPERABLE IN WIRELESS NETWORKS

(75) Inventor: Paul Waxelbaum, Freehold, NJ (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 09/977,720

(22) Filed: Oct. 15, 2001

(65) Prior Publication Data

US 2003/0071126 A1 Apr. 17, 2003

(51) Int. Cl.⁷ ............................................. G02B 26/10
(52) U.S. Cl. ................................................ 235/462.25
(58) Field of Search ........................ 235/462.25, 462.01, 235/462.46, 472.01, 472.02; 705/14, 26, 27; 709/213, 214, 215, 212, 230–232, 310–313

(56) References Cited

U.S. PATENT DOCUMENTS

| | | | | |
|---|---|---|---|---|
| 5,029,183 A | * | 7/1991 | Tymes | 375/141 |
| 5,528,025 A | * | 6/1996 | Swintek | 235/462.46 |
| 5,640,002 A | * | 6/1997 | Ruppert et al. | 235/462.46 |
| 5,696,903 A | * | 12/1997 | Mahany | 709/228 |
| 5,721,421 A | * | 2/1998 | VanDonkelaar | 235/462.15 |
| 5,945,660 A | * | 8/1999 | Nakasuji et al. | 235/462.46 |
| 6,027,024 A | * | 2/2000 | Knowles | 235/472.01 |
| 6,076,733 A | * | 6/2000 | Wilz et al. | 235/462.01 |
| 6,091,956 A | * | 7/2000 | Hollenberg | 455/456.5 |
| 6,161,760 A | * | 12/2000 | Marrs et al. | 235/462.15 |
| 6,314,406 B1 | * | 11/2001 | O'Hagan et al. | 705/14 |
| 6,405,927 B2 | * | 6/2002 | Sojka et al. | 235/462.46 |
| 6,473,805 B2 | * | 10/2002 | Lewis | 709/246 |
| 6,493,747 B2 | * | 12/2002 | Simmon et al. | 709/208 |
| 6,571,294 B2 | * | 5/2003 | Simmon et al. | 709/234 |

\* cited by examiner

Primary Examiner—Thien M. Le
Assistant Examiner—Edwyn Labaze
(74) Attorney, Agent, or Firm—Kirschstein, et al.

(57) ABSTRACT

A bar code reader data communications method using radio paging networks, comprising: reading a bar code symbol with a bar code reader and storing the data in the reader; electrically coupling the bar code reader with a mobile communications transceiver; transferring the data from the bar code symbol reader to the transceiver and processing the data into a message; and transmitting the message over a wireless communication link to a base station.

4 Claims, 6 Drawing Sheets

COUPLING OF BAR CODE DATA READERS TO MOBILE TERMINALS OPERABLE IN WIRELESS NETWORKS

REFERENCE TO RELATED APPLICATIONS

This application is related to U.S. patent application Ser. No. 09/825,723 filed Apr. 4, 2001.

BACKGROUND OF THE INVENTION

1. Field of the Invention

The apparatus and methods consistent with the present invention relates to discrete or modular bar code readers which can be coupled to transceiver or computer terminals which communicate over wireless networks, and more particularly to the network architecture, configuration software, and inter-network messaging and communications protocols needed to support physical coupling and message services from small, portable bar code reader units to mobile transceiver units operated in such networks, and from network to network.

2. Background of the Invention

Wireless local area networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local area network, including, optionally, one or more servers or host computer systems.

One type of mobile computer terminal coupled to or incorporating a bar code symbol reader as bar code symbol readers, are now very common for data collection applications. Typically, a bar code symbol comprises one or more rows of light and dark regions, typically in the form of rectangle. The relative widths of the dark regions, i.e., the bars and/or the widths of the light regions, i.e., the spaces, between the bars encode data or information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient taking of inventories, tracking of work in progress, etc.

A variety of scanning systems are known. One particularly advantageous type of reader is an optical scanner which scans a beam of light, such as a laser beam, across the symbols. Laser scanner systems and components of the type exemplified by U.S. Pat. Nos. 4,387,297 and 4,760,248 which are owned by the assignee of the instant invention and are incorporated by reference herein have generally been designed to read indicia having parts of different light reflectivity, i.e., bar code symbols, particularly of the Universal Product Code (UPC) type, at a certain working range or reading distance from a hand-held or stationary scanner.

Wireless and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the communications between a given terminal and the network through the selected access point. One such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard").

Wireless messaging through gateways from the Internet, or LANs, is also known, such as from U.S. Pat. No. 6,178,331. Although such techniques allow messages to be generated manually or automatically, the ability of a user to use a bar code reader as a data source, and to choose from different transceivers or communications options is limited.

Prior to the present invention, there has not been a simple, two stage data entry technique which would allow a user of a mobile computer to first read a bar code symbol with a portable reader, and then physically attach or couple the reader a portable transceiver for send a message including the data encoded in the symbol from the transceiver over a wireless local area network to a destination station.

SUMMARY OF INVENTION

1. Objects of the Invention

It is a general object of the present invention to provide a messaging or communications protocol and network architecture using a bar code symbol reader, and a separate transceiver, for data entry for communicating bar code symbol data over a communications network.

It is another object of the invention to provide a method for acquiring and sending data from a mobile station in a network using a bar code reader data collection terminal.

It is a further object of the present invention to provide a logical interface between a portable bar code reader, a transceiver terminal, a wireless personal area network or LAN, and remote stations in a radio paging network.

It is another object of the present invention to provide communication from a bar code reader to a base station or access point in a wireless LAN, and a communications gateway to a broadband communications channels or networks, including a radio paging network.

It is an even further object of the invention to provide a method which can be used to accomplish one or more of the above objectives.

Additional objects, advantages and novel features of the present invention will become apparent to those skilled in the art from this disclosure, including the following detail description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

The present invention provides a bar code reader data communications method with the steps of reading a bar code symbol with a bar code reader and storing the data in the reader; electrically coupling the bar code reader with a mobile communications transceiver; transferring the data from the bar code symbol reader to the transceiver and processing the data into a message; and transmitting the message over a wireless communication link to a base station.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF DRAWING

Like reference symbols in the various drawings indicate like elements.

DESCRIPTION OF THE PREFERRED EMBODIMENT

Figure 1:
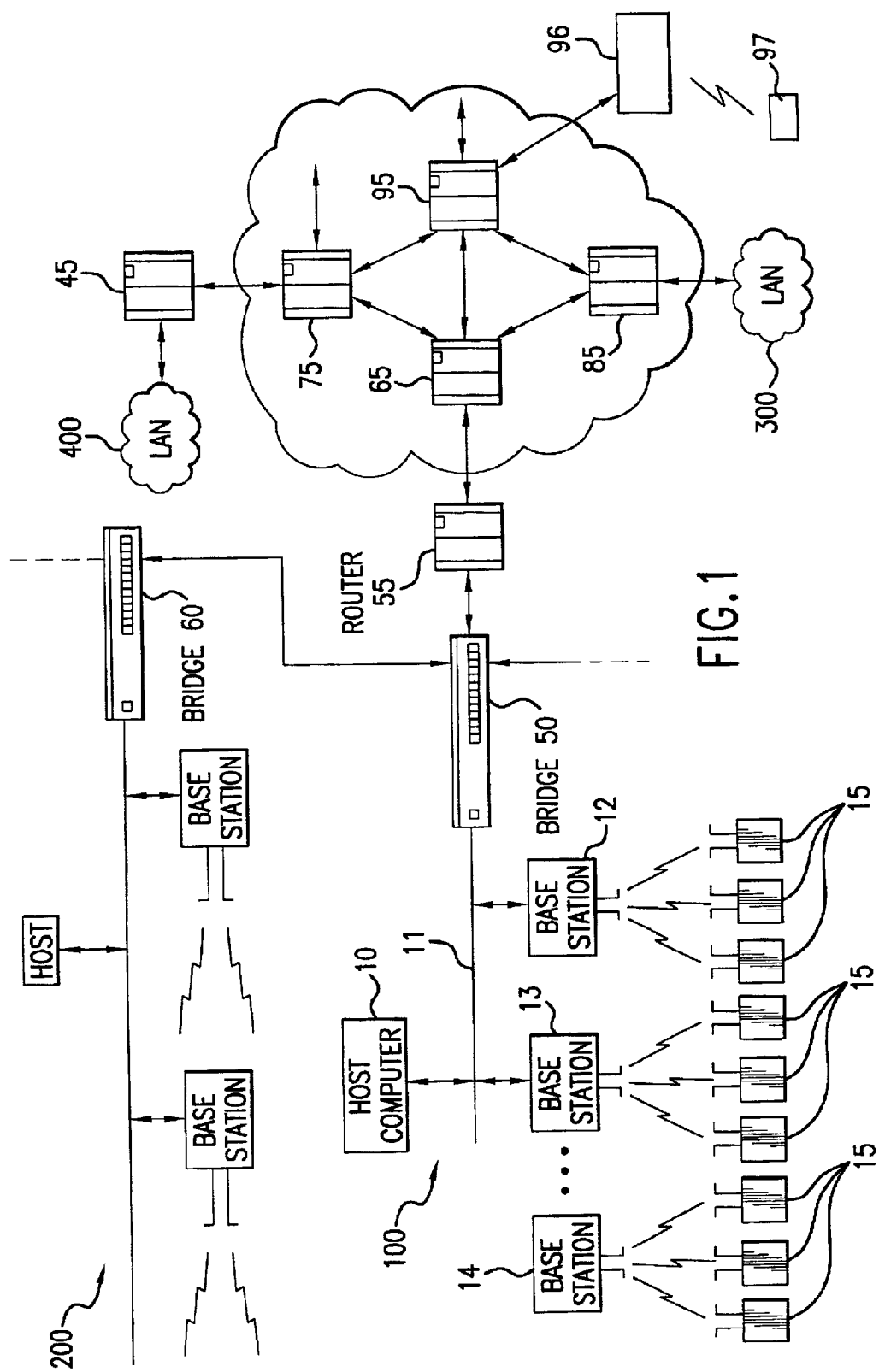
FIG. 1 illustrates a network environment in which the present invention can be implemented.

Referring now to the figures, FIG. 1 shows a diagrammatic representation of a typical networking environment consistent with the present invention in a preferred embodiment of the home small office, school, or similar public or private space. The physical hardware components reside at the lowermost OSI layer, or physical layer, and include various nodes distributed along the network link or cabling. Although the term "node" broadly refers to all types of physical devices attached to the network link, only client and server nodes are depicted in FIG. 1.

More specifically, FIG. 1 illustrates clients and servers interconnected through a network link, although additional clients and servers, as well as other types of nodes, may be distributed along the network link as well. As used in this specification, the term "client" will generally denote a peripheral device or network appliance of some type associated with a user. The term "server" includes any device directed for controlling and coordinating shared usage of an network resource, such as an access point, or website content or data source.

Referring now to the figures, FIG. 1 shows a data communications network according to one embodiment of the invention. A first local area network 100 is illustrated, which is a preferred embodiment includes a host processor 10 connected by a wired communications link 11 to a number of stationery access points or base stations 12,13; other base stations 14 can be coupled to the host through the base stations or by an RF link. Each one of the base stations 12,13,14 is coupled by an RF link to a number of remote portable mobile units 15. In one embodiment, the portable mobile units 15 are hand-held, battery-operated data terminals, pagers, or voice communication handsets such as described in U.S. Pat. Nos. 5,029,183; 6,119,944; and Ser. Nos, 09/002,822; 09/008,710, filed Jan. 16, 1998, and 09/467,905 filed Dec. 21, 1999 all assigned to Symbol Technologies, Inc., and each incorporated herein by reference. In addition to the architecture shown if FIG. 1, wide area networks, cellular networks, or other wireless internetworking nodes may also be used. On such network is described in U.S. Pat. No. 5,901,362 of IBM, which is hereby incorporated by reference and similar ad-hoc networks without fixed or base stations are also within the scope of the present invention.

Although hand-held, laser scanning bar-code reader data terminals are the preferred data collection device, the data terminals may also include bar-code readers of the CCD or wand type, and may be portable or stationery or worn by the user rather than hand-held. The mobile units 15 may also function as voice communication handsets, pagers, still image or video cameras, cellular telephones, AM/FM radio broadcast receivers, or any combination of the foregoing. Other types of data gathering devices may be utilized as terminals and use the message forwarding features of the invention, such as temperature, pressure, or other biophysical or environmental measuring devices, event counters, voice or sound activated devices, intrusion detectors, etc.

Various other types of portable terminals may be advantageously employed in a system having features of the invention; these portable terminals ordinarily could utilize data entry media such as keyboards, touchscreens, a magnetic cards, RFID tags, biometric sources, SIM devices, smart cards, electronic key (e.g. "Ving") access cards, or the like, as well as a display (or printer) for providing a display of the information detected, transmitted and/or received by the terminal. In this embodiment used as an illustrative example, there may be from one up to sixty-four of the base stations (three stations being shown in the Figure) and up to several hundred of the remote portable units; of course, the network is scalable and may be expanded by merely changing the size of address fields and the like in the digital system, as will appear, but a limiting factor is the RF traffic and attendant delays in waiting for a quiet channel.

The first LAN 100 may be coupled to additional LANs 200, 300, 400 etc. through controllers such as bridges 50, 60, etc. or routers 55, 65, 75, 85, etc.

The network may also include a server 95 which may be associated with an Internet site, and may include a plurality of software components that can be accessed by an agent program. Such components may include one or more object classes including applets, servlets, Java Beans (TM) etc. or in general any executable unit of code.

The server may be a directory server or standard database management system. The server 95 may include facilities for address translation, formatting, storage, and encryption key management, among others.

In one aspect of the present invention, the server 95 may manage paging requests to be sent to one or more paging transmitters 96, which sends page alerts or text messages to pagers 97. Such a paging application will be described in greater detail subsequently.

Such communications networks, as depicted in FIG. 1, may also ordinarily be used in a convention centers, manufacturing facility, office building complex, warehouse, retail establishment, shopping malls, or like commercial or public facility, or combination of these facilities, where the data-gathering terminals or mobile units would be used for inventory control in stockroom or receiving/shipping facilities, at checkout (point of sale) counters, for reading forms or invoices of the like, for personnel security checking at gates or other checkpoints, at time clocks, for manufacturing or process flow control, for providing information to customers (such as location, and directions to a site or person) and many other such uses.

An RF packet communications protocol is provided between the remote units and the base stations, and includes a transmit/receive exchange, referred to hereinafter simply as an "exchange". This protocol is similar to collision-sense multiple access (CSMA) in that a unit first listens before transmitting, and does not transmit if the channel is not free. This exchange always begins with a remote-to-base transmitted packet, representing an RF transmission from a remote unit to be received by the base stations within range. The transmitted packet is followed after a fixed time interval by a base-to-remote unit of RF information transmitted by the base station servicing this particular remote unit. Each of these packets is of fixed timing; a transceiver in a remote unit begins an exchange at its own initiative by first listening for other traffic for a brief interval $t_o$ (typically 0.3 msec.) and, if the RF channel is quiet, starting a transmission at a time of its own selection (asynchronous to any clock period of the base stations or host computer). This outgoing transmission packet lasts for a time $t_1$ as seen in the Figure, and in an example embodiment this period is 4.8 milliseconds. Then at a precise time delay $t_2$ after it started transmission (e.g. 5 msec after the beginning of $t_1$) the transceiver begins listening for the return packet from the base station. The transceiver in the remote unit only responds to receipt of the packet beginning in a very rigid time window $t_3$ of a few microseconds length, and if the packet has not started during this window then anything to follow is ignored. The packet is an acknowledge signal, and also contains data if the base station has any message waiting to be sent.

The steps carried out by a mobile unit 15 which is not currently associated to an access point in selecting an access point according to the IEEE 802.11 standard are described as follows. The mobile unit (MU) sends out a probe packet to all access points (APs), typically at the lowest data rate it is otherwise able to use with the network. The probe packet contains the mobile unit source address but has no destination address and hence any access point that detects the probe packet and is capable of responding at the same data rate must send a response. Accordingly, the probe packet is detected by all access points within range and a subset of those access points sends out a probe response packet. An evaluation of the signal quality and possibly other factors is made by the MU of the communications with the most eligible access point (if any) at the highest data rate. If such communications are acceptable, the MU will associate with the selected AP.

If the MU is already associated with an access point and operating at a data rate lower than the highest data rate, then depending upon the performance statistics, it will carry out an update probe at predetermined intervals to see if it can operate at a higher data rate, and associate with a new AP at the higher data rate. Such association with different AP, known as roaming, is typically encountered when the MU is moved in and out of range, e.g. to and from the periphery of the range of the original of AP, but may occur even if the mobile unit is motionless during conditions of fluctuations in traffic on the AP with which the MU is associated.

The MU can be used for a variety of information retrieving and computing purposes including but not limited to Internet access, data base lookup, order entry, messaging, document preparation and word processing, scheduling, mathematical computation, and the like. For these purposes, MU are provided with operating system software. In an embodiment, the operating system can be Windows 9x, Windows 2000, CE or NT platforms. In other embodiments, the operating system can be Mac OS, Palm OS, or Linux. In one embodiment, the memory 341 can be random access memory into which the operating system is loaded. In another embodiment, the memory 341 can be any type of firmware such as EPROM or EEPROM into which the operating system is "burned".

Figure 2:
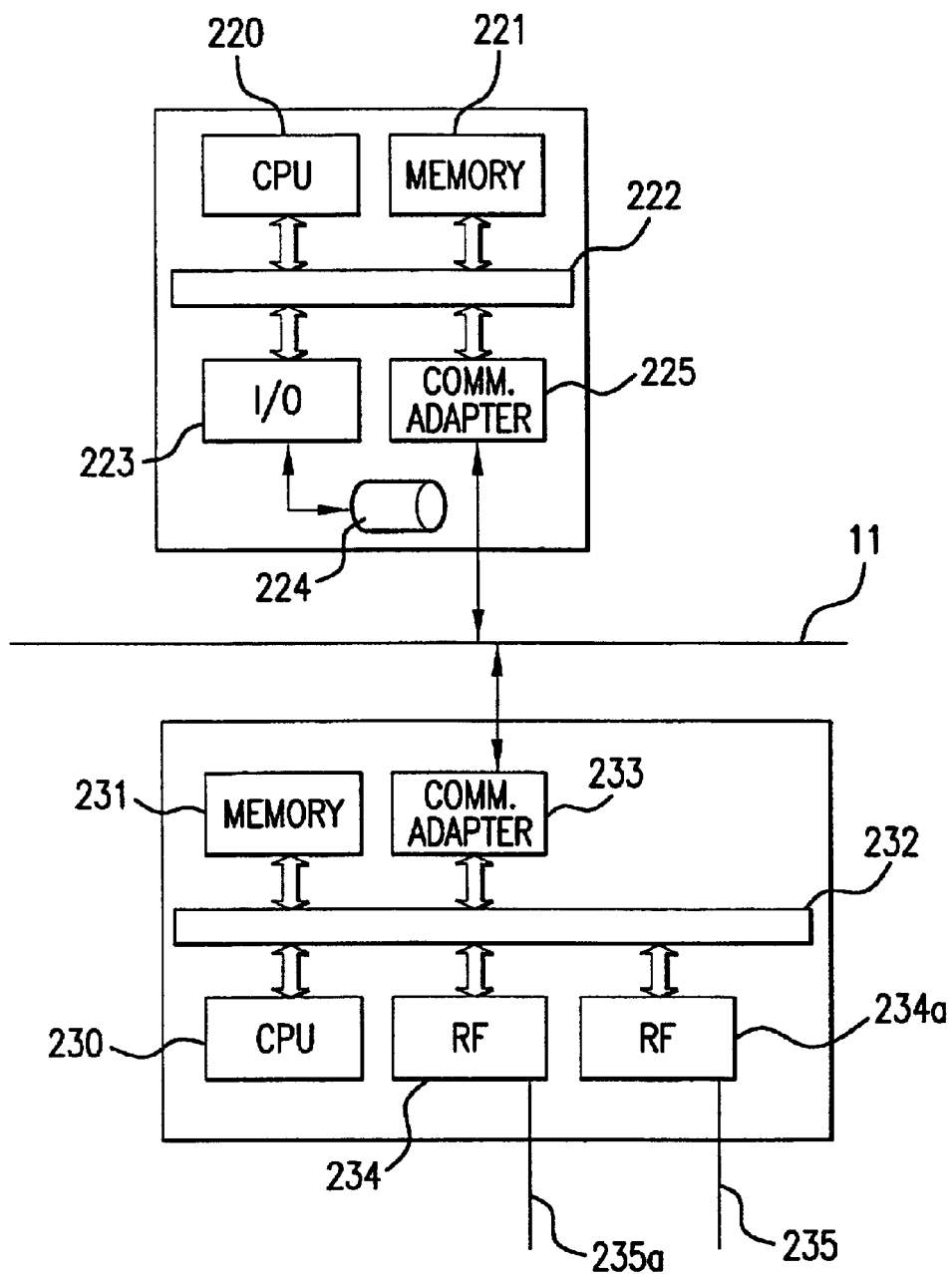
FIG. 2 illustrates a block diagram of a host computer and a base station in a wireless local area network.

FIG. 2 illustrates a detailed view of a host computer 10 and a base station 12, 13, 14 of FIG. 1. The host computer 10 includes a central processing unit (CPU) 220 that is connected to a memory 221 through a bus 222. An I/O module 223 connects the host computer to various devices such as a keyboard, video display and other peripherals. Disk storage 224 is connected to the I/O modules 223. A communications adapter 225 connects the CPU 20 through the bus 222 to the communications link 11.

The base stations 12, 13, 14 each utilize a CPU 230 connected to a memory 231 through a bus 232. A communications adapter 233 connects the bus 232 to the communications link 11. An RF transceiver 234 is connected to the CPU 230 in each base station 12, 13, 14 through the local bus 232 and is connected to an antenna 235 for RF transmission and reception from the remote units 15 using a transmit/receive exchange protocol. In one embodiment, the exchange protocol is similar to a collision—sense multiple access (CSMA). An additional RF transceiver 234a can be used as an RF link to and from other base stations, if necessary.

Base stations 12, 13, 14 are typically stationary units that use line power and often not accessible to an operator. The RF signal path in a typical environment is changeable because equipment in the environment may move around as well as the locations of the remote units 15. As a result, the particular base station that is in communications with the remote 15 can change. In an implementation, a "hand-off" protocol is used to change the base station that is designated to communicate with the remote unit 15. In this manner, a remote unit 15 has a confirmed virtual link with only one base station at a time, although other base stations may be in range. The base stations 12, 13, 14 act as intermediaries for the communication link between the remote unit 15 and the host computer 10. The main function of the base stations 12, 13, 14 is to relay data between the remote units 15 and the host computer 10.

One aspect of the present invention is to provide a method of messaging in a virtual network including at least two spatially separate individual wireless local area networks (WLANs) using a bar code reader as a data entry and activation controller. Such a method entails establishing a web server at an Internet node; and providing a connection from an access point in each of the WLANs to the Internet node. The process begins by the user reading a bar code symbol using a first mobile unit in the first WLAN. The unit then decodes the bar code symbol and encodes a message using the symbol data into a packet with a destination address corresponding to the Internet node.

The unit then transfers the packetized message over the WLAN to the web server at the Internet node. At the web server, a polling process may be used to determine if the second mobile unit is active on the network at the time the packetized textual message is received at the web server. If so, the message is sent immediately to the destination mobile unit.

At the web server, one can create a private web page with textual message from the first mobile unit. If the second mobile unit is active, the server will transmit an alert from the web server to the second mobile unit that a message destined for such unit is available at the indicated web page.

Figure 3:
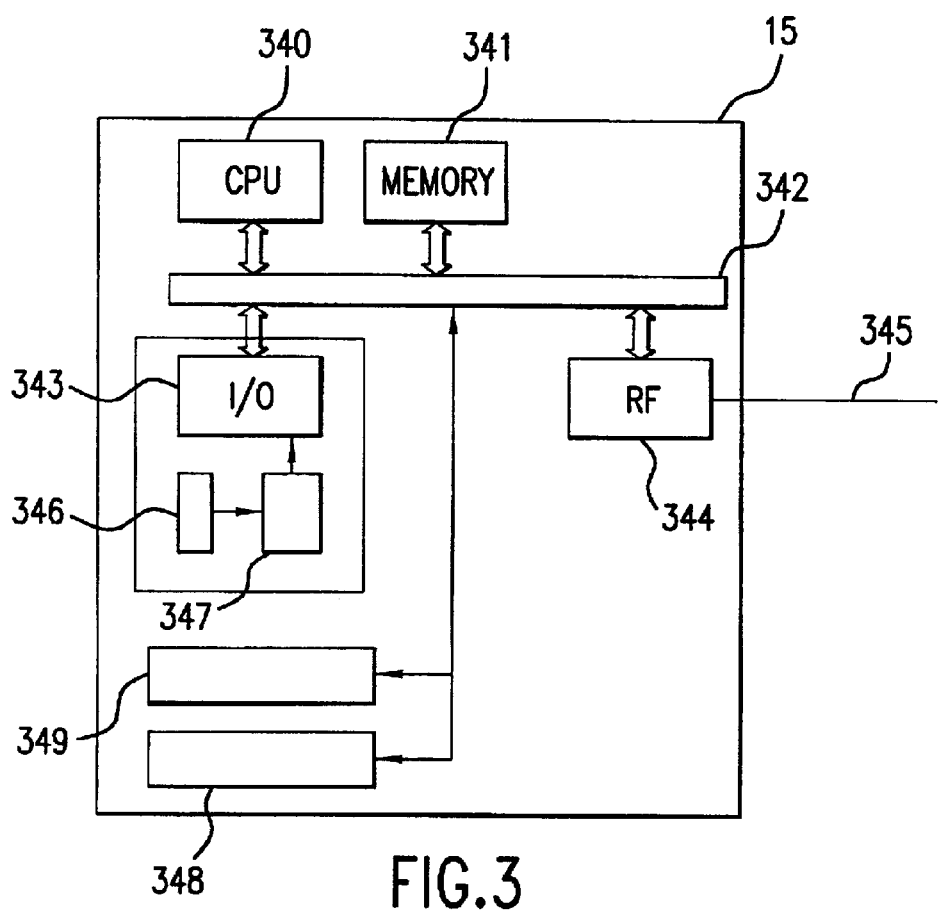
FIG. 3 illustrates a block diagram of a mobile unit.

FIG. 3 illustrates a detailed view of a remote unit 15. The remote unit 15 includes a CPU 340 connected to a local bus 342. A memory 341 is also connected to the local bus 342, and can provide instructions to the CPU 340. A peripheral bar code data acquisition device 343 is optionally coupled to the CPU via the bus 342. The device 343 can be used to detect and/or decode data from a bar code (not shown). The device 343 can be used to input data from a photodetector device 345 that produces a serial electrical signal fed to a decoder 347 responding to the characteristic patterns of bar code symbols and providing bar code data to the memory 341 via device 343 when a bar code is scanned. The bar code data can be moved to memory by a variety of techniques such as direct memory access (DMA) or CPU instructions. Ultimately the bar code data is transferred to an RF transceiver 344 for transmission to the base unit 12, 13, 14 and ultimately the host computer 10. The RF transceiver 344 is coupled to and controlled by the CPU through the bus 342, and transmits the RF signal through an antenna 345 or detects and converts RF signals received by the antenna 345.

Typically, the remote unit 15 has a manual entry device 348 such as a keyboard, and a visual display 349 such as a liquid crystal display (LCD) device. The elements of the entry device 348 and the display 349 are scanned by signals generated in the CPU 340, or generated in a entry device and display I/O controller. In one embodiment, the I/O controller is an Intel® 8052 microcontroller.

Figure 4:
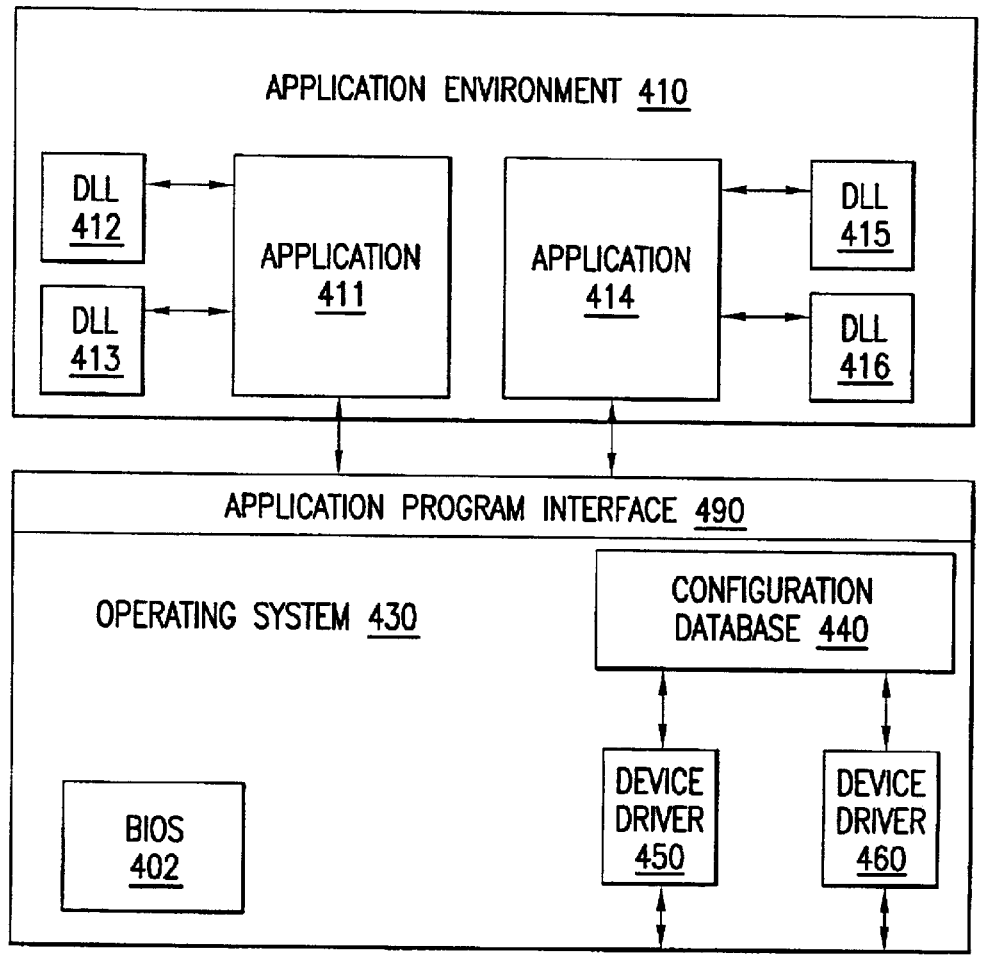
FIG. 4 illustrates an operating system and application environment in the mobile unit.

FIG. 4 illustrates an operating system having an application environment. As discussed above the operating system 430 can be one of the various Windows environments. The operating system 430 provides software to manage configure, enable and allocate physical resources of the MU 15. For example, the operating system 430 may include a memory allocation algorithm to allocate the memory 341 among various software tasks. Additionally, the operating system includes instructions from the memory to control the RF transmissions and receptions as well as data flow between the data acquisition device 343 and the RF transceiver 344.

An application environment 410 contains one or more software application processes 411, 414. The applications 411, 414 can be any variety of applications for use on the remote unit 15. For example, the application 411 can be a browser for connecting to a network such as the Internet. The application 414 can be a configuration program that configures the remote unit 15 for use with the network to which the remote unit 15 connects.

Each application 411, 414 can have one or more processes 412, 413, 415, 416 respectively, associated with them. These processes can serve a variety of purposes related to the applications 411, 414. For example, one or more of the processes can be a dynamic link library (DLL) 412, 413, and 415, 416 respectively associated with it. A DLL is a feature of Windows platform that allow executable code modules to be loaded on demand and dynamically, and linked at run time. Library code can be updated, transparent to the application 411, 414, and unloaded when no longer needed.

The operating system 430 can include an application programming interface 490 (API). The API 490 is the software that the application processes 411, 414 use to request and carry out lower level services performed by the operating system 430. For Windows, the API also helps applications 411, 414 manage windows, menus, icons and other graphical user interface (GUI) elements. The API 490 includes a set of standard software interrupts, calls and data formats applications 411, 414 use to initiate contact with device drivers 450, 460.

The operating system 430 can include one or more device drivers 450, 460. The device drivers 450, 460 provide control functionally specific to a particular physical device or class of devices. Additionally, the device drivers 450, 460 provides standard software interfaces allowing other system components to access the controlled device. For example, one device driver 450 can control the code data acquisition device 343 and provide data to and from applications 411, 414 through the API 490. The other device driver 460 can control the RF transceiver 344 that allows data to be transferred from operating system 430 to the RF transceiver 344 through device driver 460. Operating system 430 also includes a BIOS 402 to run standard start up routines for the remote unit 15.

A variety of application programs can be included in the operating system. One such application according to the present invention is a scan data entry and radio activation program. Such an application program derives data from scanning a bar code symbol, and places it in a message for automatic transmission by the RF transceiver. A key aspect of the present invention is that such operations may be done automatically through the use of an auto configuration program in which a profile has been created to automatically transmit the data to an Internet or other network website for further processing at a server 95, such as for deriving destination address and hand-off to another type of network. This auto configuration program can enable a user to store configurations for numerous servers such that when a user turns on the mobile unit 15, the program automatically loads the correct configuration to communicate with each server or destination station that the mobile unit 15 may wish to send a message.

The present invention provides an automated method of alerting a mobile user having a pager or other mobile alerting device when a particular auto-ID source data, such as a bar code symbol, is read by another mobile user with a bar code reader associated with a network unit with a specific user ID. The bar code reader may be implemented in a mobile unit 15 such as shown in FIG. 1. Associated with the mobile unit 15 is a unique address, which for purposes of discussion may be an IP address. The method contemplates that the data from the bar code symbol and the user ID is sent as a message over a wireless network, such as network 100 in FIG. 1, to a server, such as server 95 in FIG. 1. The server 95 functions to process the message and determines what further action to be taken in the form of sending a new message to destination station. For example, the server will include a database with cross-reference information to associate an input user ID and bar code symbol data with a particular message text and destination.

The server 95 may function as a distribution node to forward the message to different destination stations over different networks. The node may be a host on a wired local or remote, network, and may be collocated with an access point on wireless local area network. The message may include the information read from the bar code symbol, the user ID or IP address, text information added by the user on the mobile unit 15, the location of the bar code reader, or standard pages of text or other content provided by the server as part of the message delivery service. Such data may be provided to the destination station through a radio frequency paging network, wide area network, cellular radio telephone service, or over the Internet. The data may be provided in any standard format, including HTML script.

Alternatively, a URL could be provided to the destination station with appropriate query strings to allow the destination station to access a page at the server website over the Internet.

Figure 5:
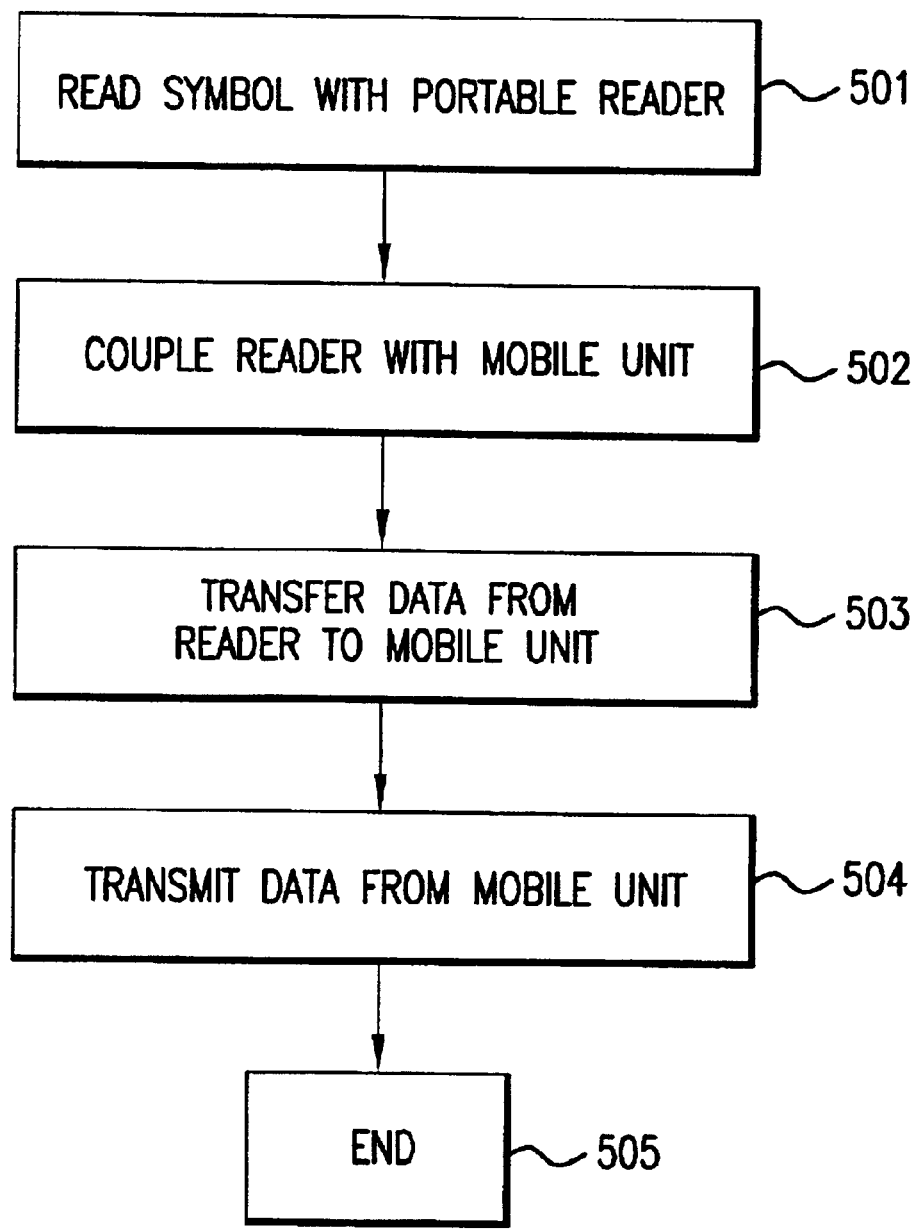
FIG. 5 illustrates a process flow diagram of a message delivery system according to the present invention.

FIG. 5 depicts a process flow diagram of the bar code reading and message delivery system according to the present invention. The user reads the symbol with the portable reader, 501, then couples it with the mobile unit, 502. One of the application programs included in the operating system of the mobile unit is a profile creation program which senses the coupling allows the user to automatically download the data from the reader to the mobile unit, 503. Assuming that the user has specified the profile of message options to be used based upon the profile selected, and destination parameters for specific profile entries are active in the mobile unit, such entries are activated when the bar code symbol data are downloaded to the mobile unit.

The downloaded data is then automatically transmitted over the wireless link to the server, 504. The profile has already specified the server location and communication address so that such transmission occurs transparently to the user. Once the server receives the message and acknowledges receipt back to the mobile unit, the process is completed, 505. The user can then decouple the reader, and utilize the reader and mobile unit for other operations, or alternatively, if the same application program is to be utilized for different data entries, the appropriate profile can then be accessed once again, as at reference 503, and the process begin once again for a different profile and the same, or a different set of bar code scanned data entries, provided to the next destination station over the wireless link.

Figure 6:
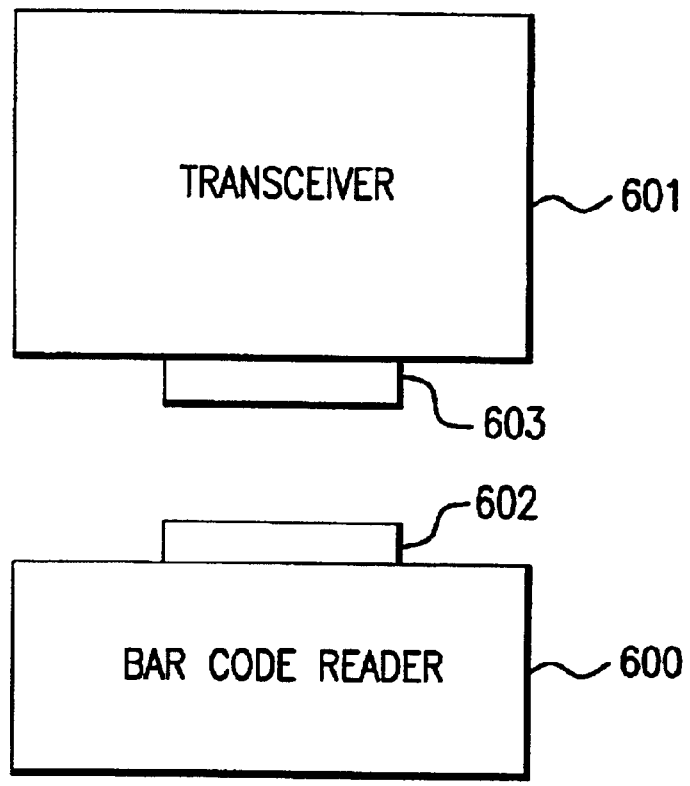
FIG. 6 illustrates an embodiment of the invention depicting the coupling of a portable bar code reader with a two-way pager.

FIG. 6 shows coupling of a bar code reader 600 to mobile transceiver 601 executing the scan data entry software according to the present invention. A connection 602 on the reader 600 is physically coupled to connect 603 on the transceiver 603, which initiates the message delivery process of FIG. 5.

Although the illustration of the reader and two way pager with the profile and scan data entry parameters chosen for a typical data collection and transfer application is purely exemplary, various other for conveying information to the user would be known to those skilled in the art. The key feature of the present invention is that various fields of a data entry profile provided on a template are entered by the scanning of a bar code symbol containing encoded text or encoded data representing information to be placed in such template field or location. After such entry has been visually verified by the user on the display of the mobile unit, the user then is immediately able to transmit the message to the destination station by means of pressing a function key or send button on the mobile unit. The automatic data capture of information through portable bar code reading, manual coupling of the unit to a transceiver or mobile unit, the automatic entry of such information in sequential order in a form template and the automatic transmission of such information over a wireless data link for alerting predetermined destination stations selected by the user at the mobile terminal is an important aspect of the present invention which is believed to provide significant efficiency and time savings in the data capture and information alerting process contemplated for many different user applications.

One application of the present invention is the use of bar code readers for locating and tracking mobile users. If a mobile pager user is interested in sending a form message a particular individual, the user can scan an appropriate bar code which would designate the message, and a message will be sent over the wireless network 100 containing the data from the bar code and the ID of the mobile unit to the server 95. At the server 95, the bar code data will be transmitted to a database which will look up the pager number of the identified individuals in a table, and then use that number to transmit an alert to the destination station. The ID of the mobile unit could be used to identify the location of the mobile unit if the database stores that information, or alternatively, location information can be appended to the message from the mobile unit and sent to the server.

Another feature of the present invention is to provide a graphical user interface which enables a user to develop a specify scanning, paging, or other notification operational parameters for a mobile unit through the use of icons, buttons, meters, slides, or other objects implemental on a interactive display. For example, the present invention may also provide an interactive display to the user depicting a graph or list of the servers, networks, or users, wherein points represent mobile units, network nodes, gateways, service providers, radio paging services, or other well known designated network units together, while lines represent channels, links, or other connectivity media. The user may define the message delivery architecture by pointing and clicking, or drag and dropping, on such objects on the display as is well known in the art so as to achieve the desired notification schedule. One such architecture is specified by a user, it may be implemented as a software file and sent to the actual various network elements represented, along with activation schedules, to indicate the duration, context, or other bounds with which the message service is to be configured.

Various aspects of the techniques and apparatus may be implemented in digital circuitry, or in computer hardware, firmware, software, or in combinations of them. Apparatus of the invention may be implemented in computer products tangibly embodied in a machine-readable storage device for execution by a programmable processor, or on software located at a network node or website which may be downloaded to the computer product automatically or on demand. The foregoing techniques may be performed, for example, single central processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in a scanning mobile unit and communications network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A message delivery system, comprising:
   a) a mobile terminal carried and operated by a first person, including a reader for electro-optically reading machine-readable indicia to generate message data corresponding to a human-readable message to be delivered to a second person remotely located from the first person, a memory for storing identification data to uniquely identify the terminal, and a wireless terminal transceiver for transmitting over a wireless medium a data signal containing the message data and the identification data, the terminal and the terminal receiver being physically separate units that are physically connected together to initiate transmission of the data signal;
   b) a server on a network having a destination database accessed by the server, including a wireless server transceiver for receiving the data signal, and for transmitting at a radio frequency over a wireless medium to a destination retrieved from the database a destination signal containing a pager alert signal and a message signal corresponding to the message data; and
   c) a mobile pager carried by the second person, including a display and a wireless pager receiver tuned to the radio frequency for receiving the pager alert signal to alert the second person that the message is available, and for receiving the message signal to deliver the message on the display for viewing by the second person.

2. The message delivery system of claim 1, wherein the reader is operative for electro-optically reading a bar code symbol as the indicia, and wherein the message on the display is in a text format.

3. A message delivery method, comprising the steps of:
   a) carrying a mobile terminal by a first person, including operating the terminal by electro-optically reading machine-readable indicia to generate message data corresponding to a human-readable message to be delivered to a second person remotely located from the first person, storing identification data to uniquely identify the terminal, transmitting over a wireless medium a data signal containing the message data and the identification data, and physically connecting the terminal to a separate terminal receiver to initiate transmission of the data signal;
   b) providing a server on a network having a destination database accessed by the server, including receiving the data signal, and transmitting at a radio frequency over a wireless medium to a destination retrieved from the database a destination signal containing a pager alert signal and a message signal corresponding to the message data; and
   c) carrying a mobile pager by the second person, including providing a display on the pager and tuning a wireless pager receiver tuned to the radio frequency for receiving the pager alert signal to alert the second person that the message is available, and for receiving the message signal to deliver the message on the display for viewing by the second person.

4. The method of claim 3, wherein the electro-optically reading step is performed on a bar code symbol as the indicia, and formatting the message on the display in a text format.

* * * * *